US008256069B2

(12) United States Patent
Haruna

(10) Patent No.: US 8,256,069 B2
(45) Date of Patent: Sep. 4, 2012

(54) LINK TYPE CLAMP DEVICE

(75) Inventor: Yosuke Haruna, Kobe (JP)

(73) Assignee: Kosmek Ltd., Hyogo (JP)

( * ) Notice: Subject to any disclaimer, the term of this patent is extended or adjusted under 35 U.S.C. 154(b) by 315 days.

(21) Appl. No.: 12/531,017

(22) PCT Filed: Mar. 12, 2008

(86) PCT No.: PCT/JP2008/054492
§ 371 (c)(1),
(2), (4) Date: Sep. 11, 2009

(87) PCT Pub. No.: WO2008/126598
PCT Pub. Date: Oct. 23, 2008

(65) Prior Publication Data

US 2010/0088862 A1 Apr. 15, 2010

(30) Foreign Application Priority Data

Mar. 15, 2007 (JP) ................................ 2007-106531

(51) Int. Cl.
*B23Q 3/08* (2006.01)
(52) U.S. Cl. ............................... 24/463; 24/494; 269/32
(58) Field of Classification Search .................... 24/463, 24/494; 269/24, 32, 20, 27, 91, 93
See application file for complete search history.

(56) References Cited

U.S. PATENT DOCUMENTS 6,279,887 B1 * 8/2001 Glasenapp et al. ............ 269/32
6,719,281 B2 * 4/2004 Kohlert ........................... 269/32
7,175,169 B2 * 2/2007 Yonezawa ....................... 269/32

FOREIGN PATENT DOCUMENTS

JP 1988-53636 4/1988
JP 2004-074408 3/2004
JP 2006-116670 5/2006

OTHER PUBLICATIONS

English translation of International Search Report in PCT/JP2008/054492, Sep. 29, 2009.

* cited by examiner

*Primary Examiner* — James Brittain
(74) *Attorney, Agent, or Firm* — Bacon & Thomas, PLLC

(57) ABSTRACT

A left end portion of a clamp arm is vertically swingably connected to an upper portion of a rod vertically movably inserted into a housing, and an annular supported member is attached to a support member rotatably around an axis, the support member being provided to an outer periphery of an upper portion of the housing. A pivot portion provided to the supported member and a non-edge portion in a longitudinal direction of the clamp arm are connected by a link member. The support member and the supported member are provided with an element for receiving an upward force acting from the link member on the pivot portion during a clamping operation. The supported member is fixed to the support member at a desired rotation angle position by a lock element.

6 Claims, 5 Drawing Sheets

LINK TYPE CLAMP DEVICE

TECHNICAL FIELD

The present invention relates to a link type clamping apparatus.

BACKGROUND OF THE INVENTION

As such a link type clamping apparatus, there are conventional ones constructed as follows as described in the following Patent Document 1 (JP2004-74408A).

A rod is vertically movably inserted into a housing, and a female screw hole is opened on an upper surface of an upper wall of the housing at a desired angle position among a plurality of angle positions around the rod. One end portion in a longitudinal direction of a clamp arm is vertically swingably connected to an upper portion of the rod, and an upper portion of a link member is swingably connected to a non-edge portion in the longitudinal direction of the clamp arm. A lower portion of the link member is swingably connected to a head portion of a connect bolt screwed into the female screw hole. Then, by advancing the rod upward, the other end portion of the clamp arm clamps downward an object to be fixed such as a work.

Patent Document 1: Japanese Unexamined Patent Publication 2004-74408

SUMMARY OF THE INVENTION

Problem to be Solved by the Invention

In the above prior art, instead of a type of clamping apparatus where the clamp arm is positioned at a standard position, in order to provide a type of clamping apparatus where the clamp arm is rotated around the rod from the standard position by a predetermined angle, a female screw hole is formed at another position corresponding to the predetermined angle on the upper wall of the housing, and the link member is connected to the connect bolt screwed into the female screw hole formed at the new position. Therefore, the prior art is excellent in that the housing can be utilized as a common member.

However in the prior art, a rotation angle position of the clamp arm is determined according to the position of the female screw hole formed on the upper wall of the housing, so that the prior art is left with room for improvement in positioning the clamp arm at a desired rotation angle position around the rod.

An object of the present invention is to realize an easy positioning of a clamping position of a clamp arm at a desired rotation angle position.

Means for Solving the Problem

In order to achieve the above object, in the present invention, for example as illustrated in FIG. 1 and FIG. 2, or FIG. 4 and FIG. 5, a link type clamping apparatus is constructed as follows:

A link type clamping apparatus includes: a rod 12 vertically movably inserted into a housing 3; a clamp arm 30 having one end portion in a longitudinal direction, the one end portion being vertically swingably connected to an upper portion of the rod 12; a support member 25 provided at an outer periphery of an upper portion of the housing 3; an annular supported member 26 attached to the support member 25 so as to rotate around an axis; a link member 33 having a link lower portion 35 and a link upper portion 34, the link lower portion 35 being swingably connected to a pivot portion 28 provided to the supported member 26, and the link upper portion 34 being swingably connected to a non-edge portion in a longitudinal direction of the clamp arm 30; a receive means A which receives an upward force acting from the link member 33 on the pivot portion 28 during a clamping operation, and is provided to the support member 25 and the supported member 26; and a lock means B for fixing the supported member 26 to the support member 25 at a desired rotation angle position around the axis.

The present invention brings about the following function and effect:

In order to change a type of clamping apparatus where the clamp arm is positioned at a standard position to a type of clamping apparatus where the clamp arm is rotated around the rod from the standard position by a predetermined angle, first, with fixing of the supported member by the lock means released, the supported member is rotated with respect to the support member by the predetermined angle, then the supported member located at the rotation angle position is fixed to the support member by the lock means.

Thereby, unlike the prior art, the clamp arm is not restricted by a position where the female screw hole is formed, thus is easily positioned at a desired rotation angle position around the rod.

It is noted that, according to the present invention, an assembled clamping apparatus or a clamping apparatus already installed to a factory also does not require another female screw hole in addition to the already formed female screw hole, thereby making it possible to change a clamping position of the clamp arm to a desired position.

Further, according to the prior art, in an assembled clamping apparatus or an installed clamping apparatus, since no additional female screw hole which interferes with the already formed female screw hole can be formed, the clamping position of the clamp arm cannot be fine-adjusted. On the other hand, in the present invention, it is only required to fine-adjust a rotation position of the supported member with respect to the support member of the housing, thereby the clamping position of the clamp arm can be fine-adjusted.

Moreover, in the prior art, female screw holes at different rotation angle positions are formed to housings of clamp apparatuses each having a different clamping position of the clamp arm, which requires individual management of housings each having a female screw hole at different positions, thus time and energy is necessary for the management. On the other hand, in the present invention, it is not require to form the female screw hole in the housing, so that the housings do not need to be individually managed, therefore time and energy is not so necessary for the management.

The following construction is preferably added to the present invention:

The receive means A includes: at least one male screw region 38 formed on an outer periphery of the support member 25 of the housing 3; and at least one female screw region 41 formed on an inner periphery of the supported member 26 so as to vertically movably screw onto the male screw region 38.

In this case, the receive means is constructed with a simple and reliable structure as screw-fitting.

The following construction is preferably added to the above invention:

The outer periphery of the support member 25 of the housing 3 is provided with at least one outer periphery fitting region 37 having a vertically straight outer peripheral surface and the male screw region 38, in a vertical direction, and the inner periphery of the supported member 26 is provided with at least one inner periphery fitting region 40 having a vertically straight inner peripheral surface which fits to the outer periphery fitting region 37 and the female screw region 41, in a vertical direction.

In this case, even when a relatively large radial fitting gap exists between the male screw region and the female screw region, the supported member is reliably fixed via the outer periphery fitting region and the inner periphery fitting region.

It is preferable that the outer periphery fitting regions 37, 37 are respectively provided to both above and below the male screw region 38, and inner periphery fitting regions 40, 40 are respectively provided to both above and below the female screw region 41.

In this case, a force acting from the link member on the supported member via the pivot portion during a clamping operation, is received by the housing via the pair of inner periphery fitting regions respectively provided to both above and below the female screw region, thereby the supported member can be reliably supported on the housing.

The following construction is preferably added to each of the inventions:

The lock means B includes: a slit 43 formed in an annular peripheral wall 27 of the supported member 26; and a tightening member 46 which makes peripheral wall portions 44, 45 approach each other, the peripheral wall portions 44, 45 being respectively positioned at both sides of the slit 43.

In this case, a simple and reliable lock means is realized.

The slit 43 is preferably provided in the annular peripheral wall 27 and arranged so as to oppose the pivot portion 28 across the rod 12.

In this case, the tightening member traversing the slit is arranged opposite to the pivot portion, thus preventing a force acting from the link member on the pivot portion during a clamping operation from being directly applied to the tightening member, thereby making the tightening member compact.

DESCRIPTION OF THE REFERENCE NUMERALS AND LETTERS

Figure 1:
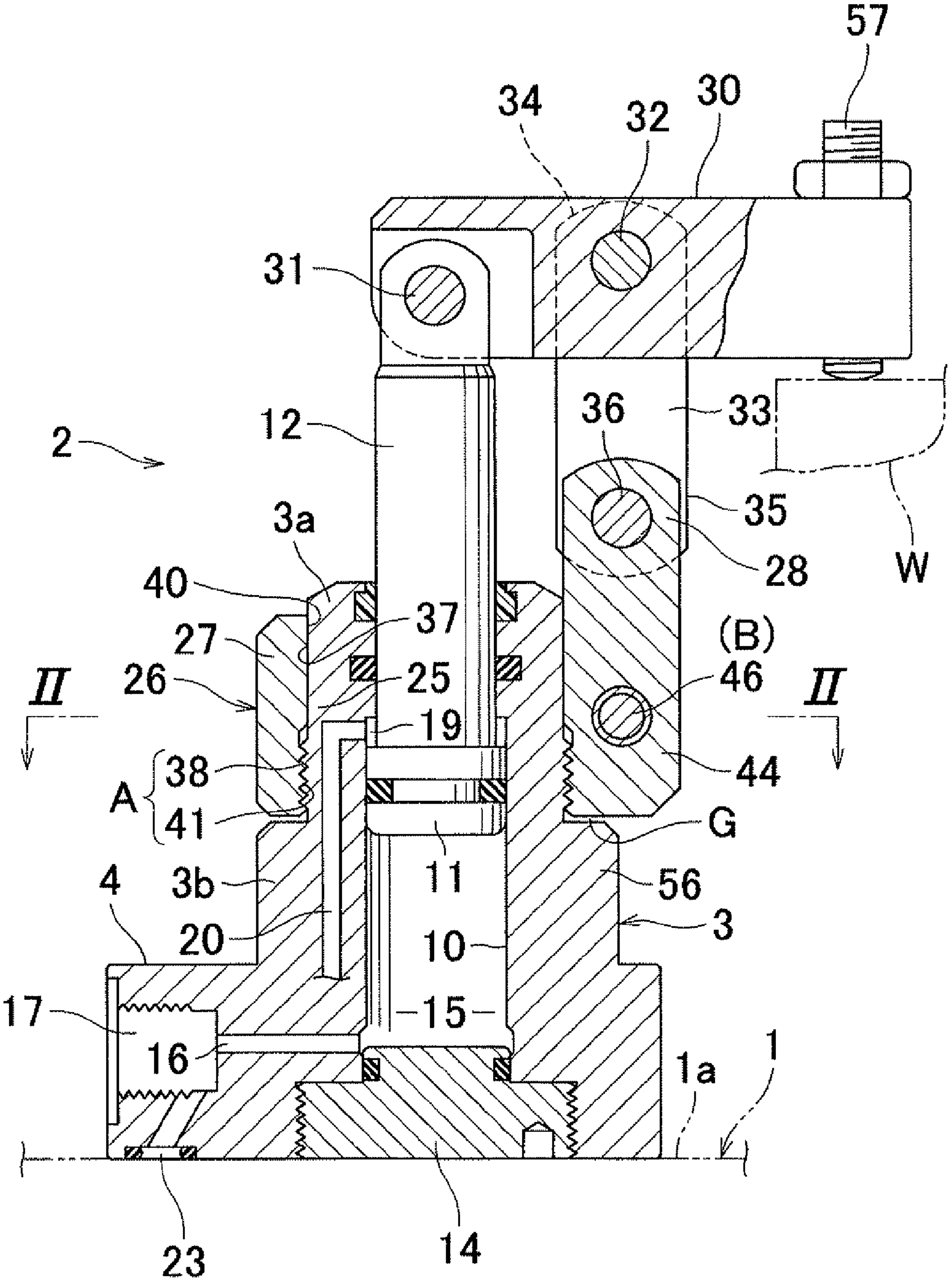
FIG. 1 is an elevation view of a link type clamping apparatus corresponding to a cross-sectional view taken along the I-I line in FIG. 2, illustrating a first embodiment of the present invention.

3: housing, 12: rod, 25: support member, 26: supported member, 27: annular peripheral wall, 28: pivot portion, 30: clamp arm, 33: link member, 34: link upper portion, 35: link lower portion, 37: outer periphery fitting region, 38: male screw region, 40: inner periphery fitting region, 41: female screw region, 43: slit, 44: peripheral wall portion, 45: peripheral wall portion, 46: tightening member (lock bolt), A: receive means, B: lock means.

BEST MODE FOR CARRYING OUT THE PRESENT INVENTION

First, a first embodiment of the present invention is described with reference to FIG. 1 and FIG. 2. The embodiment exemplifies a case where a clamping apparatus 2 is arranged on a work pallet 1. A housing 3 of the clamping apparatus 2 has a lower flange portion 4, and a stepped hole 5 for bolt insertion (see FIG. 2) is formed in each of four corner portions of the lower flange portion 4.

The housing 3 is attached to the work pallet 1 with a plurality of fastening bolts (not illustrated) respectively inserted into the stepped holes 5. A work W is fixed to an upper surface 1*a* of the work pallet 1 by the clamping apparatus 2.

A piston 11 is hermetically inserted into a cylinder hole 10 of the housing 3 in a vertically movable manner, and a rod 12 integrally protrudes upward from the piston 11. The rod 12 is hermetically inserted into an upper end wall 3*a* of the housing 3 in a vertically movable manner. A clamp chamber 15 is formed between a cover bolt 14 screwed into a lower portion of the lower flange 4 and the piston 11. The clamp chamber 15 is communicatively connected to a supply and discharge port 17 for clamping via a horizontal passage 16 formed in the lower flange 4. Further, an unclamp chamber 19 being formed between an upper end wall 3*a* of the housing and the piston 11. The unclamp chamber 19 is communicatively connected to a supply and discharge port 21 for unclamping via a vertical passage 20 formed in a barrel portion 3*b* of the housing 3. The two supply and discharge ports 17, 21 are opened on a side surface of the lower flange 4. It is noted that another supply and discharge port 23 communicatively connected to the supply and discharge port 17 for clamping is sealed by an upper surface 1*a* of the work pallet 1. The same applies to the supply and discharge port 21 for unclamping.

A support member 25 is provided at an outer periphery of an upper portion of the housing 3. An annular supported member 26 is attached to the support member 25 rotatably around an axis. A pivot portion 28 integrally protrudes upward from a portion of an annular peripheral wall 27 of the supported member 26. Further, a left end portion (one end portion) in a longitudinal direction of a clamp arm 30 is connected to an upper portion of the rod 12 by a first pin 31 in such a manner that the clamp arm 30 is swingable in a vertical plane. A non-edge portion in the longitudinal direction of the clamp arm 30 is connected to a link upper portion 34 of a link member 33 by a second pin 32 in such a manner that the clamp arm 30 is swingable in a vertical plane. Further, a link lower portion 35 of the link member 33 is swingably connected to the pivot portion 28 by a third pin 36. It is noted that two link members 33 are provided so as to sandwich the pivot portion 28 and the clamp arm 30 from both sides. However, FIG. 1 only shows one of the link members 33.

An upper half portion of an outer periphery of the support member 25 is provided with an outer periphery fitting region 37 having a vertically straight outer peripheral surface, and a lower half portion of the outer periphery of the support member 25 is provided with a male screw region 38. Corresponding thereto, an upper half portion of an inner periphery of the supported member 26 is provided with an inner periphery fitting region 40 having a vertically straight inner peripheral surface which fits to the outer periphery fitting region 37, and an lower half portion of the inner periphery of the supported member 26 is provided with a female screw region 41 which vertically movably screws onto the male screw region 38. The male screw region 38 and the female screw region 41 compose a means A for receiving an upward force acting from the link member 33 on the pivot portion 28 during a clamping operation.

There is provided a lock means B which fixes the supported member 26 to the support member 25 at a desired rotation angle position around the axis. The lock means B includes: a slit 43 formed in the annual peripheral wall 27 of the supported member 26; a lock bolt (tightening member) 46 which makes peripheral wall portions 44, 45 approach each other, the peripheral wall portions 44, 45 being respectively positioned at both sides of the slit 43.

The slit 43 is opened on an upper and lower end surface of the annular peripheral wall 27 so as to communicatively connect an inner periphery and an outer periphery of the annular peripheral wall 27, and is formed to a position horizontally shifted with respect to the pivot portion 28 so as not to interfere with the pivot portion 28.

A leg portion of the lock bolt 46 inserted into a bolt insert hole 48 of one peripheral wall portion 44 is screwed into a female screw hole 49 of the other peripheral wall portion 45, and the lock bolt 46 is tightened, thereby the annular peripheral wall 27 of the supported member 26 is diametrically contracted radially inward, so that the inner periphery fitting region 40 of the annular peripheral wall 27 is pressed against the outer periphery fitting region 37 of the support member 25. This makes it possible to fix the supported member 26 to the support member 25 at a desired rotation angle position around the axis.

According to the embodiment, even when a relatively large radial fitting gap exists between the male screw region 38 and the female screw region 41, the supported member 26 is reliably fixed via the outer periphery fitting region 37 and the inner periphery fitting region 40.

Further, there is provided a means for determining a phase of the supported member 26 with respect to the support member 25 among three rotation angle positions located at intervals of substantially ninety degrees around the rod 12. The phase determination means 51 is constructed as follows. As illustrated in FIG. 2, a set screw 52 is screwed into the annular peripheral wall 27 of the supported member 26 at a position corresponding to a substantial midway angle position between the two supply and discharge ports 17, 21. An inner end portion of the set screw 52 is engaged with an engaging groove 54 provided to an outer periphery portion of the support member 25. Three engaging grooves 54 are circumferentially provided at intervals of substantially ninety degrees. It is noted that an outer end portion of the set screw 52 is screwed into a lock nut 55.

It is also noted that, in a state where the clamp arm 30 is arranged as illustrated, as shown in FIG. 1, a predetermined gap G is formed between an upper surface of an annular shoulder portion 56 and a lower surface of the supported member 26, the shoulder portion 56 being provided to a middle height portion of the housing 3.

The clamping apparatus 2 operates as follows.

During a clamping operation, as illustrated in FIG. 1, when pressurized oil in the unclamp chamber 19 is discharged and pressurized oil is supplied to the clamp chamber 15, the rod 12 ascends, so that the clamp arm 30 is driven clockwise around the second pin 32, thus a press bolt 57 provided to a right end portion of the clamp arm 30 presses the work W downward. During this clamping operation, an upward force acts from the link member 33 on the pivot portion 28. However, this upward force is received by the housing 3 via the receive means A having the male screw region 38 and the female screw region 41.

Contrary to the above, during an unclamping operation, pressurized oil in the clamp chamber 15 is discharged, and pressurized oil is supplied to the unclamp chamber 19. Then, the rod 12 descends, thus the clamp arm 30 is retreated counterclockwise.

Figure 2:
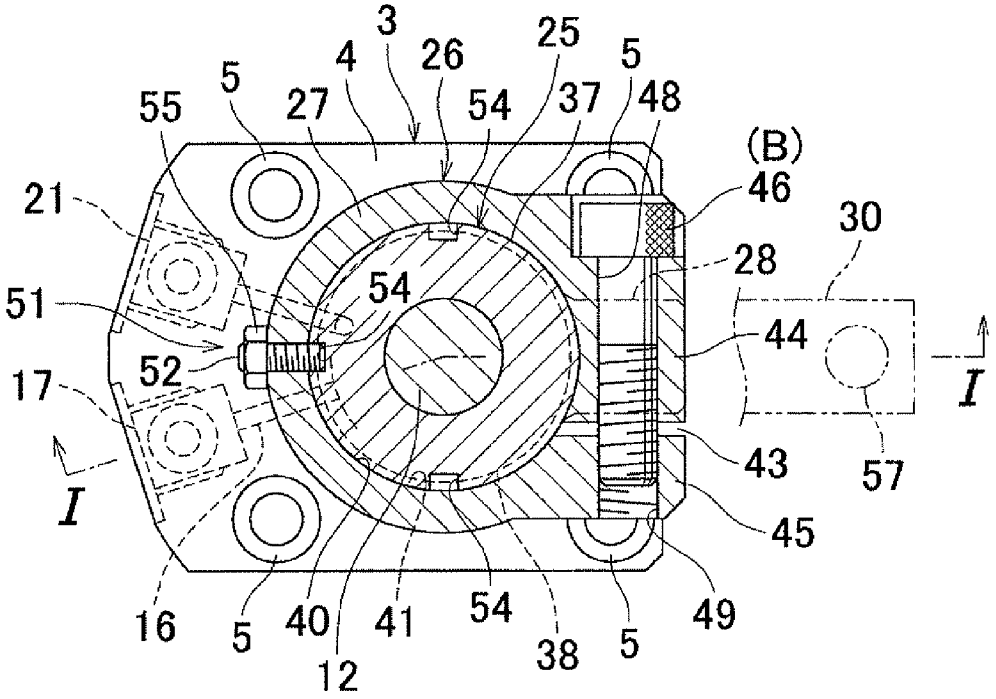
FIG. 2 is a cross-sectional view corresponding to a view taken along the II-II line in FIG. 1.

To obtain a type of clamping apparatus where the clamp arm 30 is horizontally rotated by ninety degrees around the rod 12 while the supply and discharge ports 17, 21 are retained at positions illustrated in FIG. 2, first, the supported member 26 is rotated with respect to the support member 25 by ninety degrees from the position illustrated in FIG. 2 and is accurately phase-determined at the rotation angle position with the set screw 52, then the supported member 26 is fixed at the rotation angle position by the lock bolt 46 of the lock means B.

A size of the gap G formed between the supported member 26 and the shoulder portion 56 is set to a value which can prevent the lower surface of the supported member 26 from interfering with the upper surface of the shoulder portion 56 when the supported member 26 is rotated to a desired rotation position.

It is noted that the phase determination with the set screw 52 is not indispensable, and thus may be omitted.

Further, without performing the phase determination with the set screw 52, it is possible to fix the supported member 26 to the support member 25 at a desired rotation angle position by the lock means B, and to fix the supported member 26 at a fine-adjusted rotation angle position.

Figure 3:
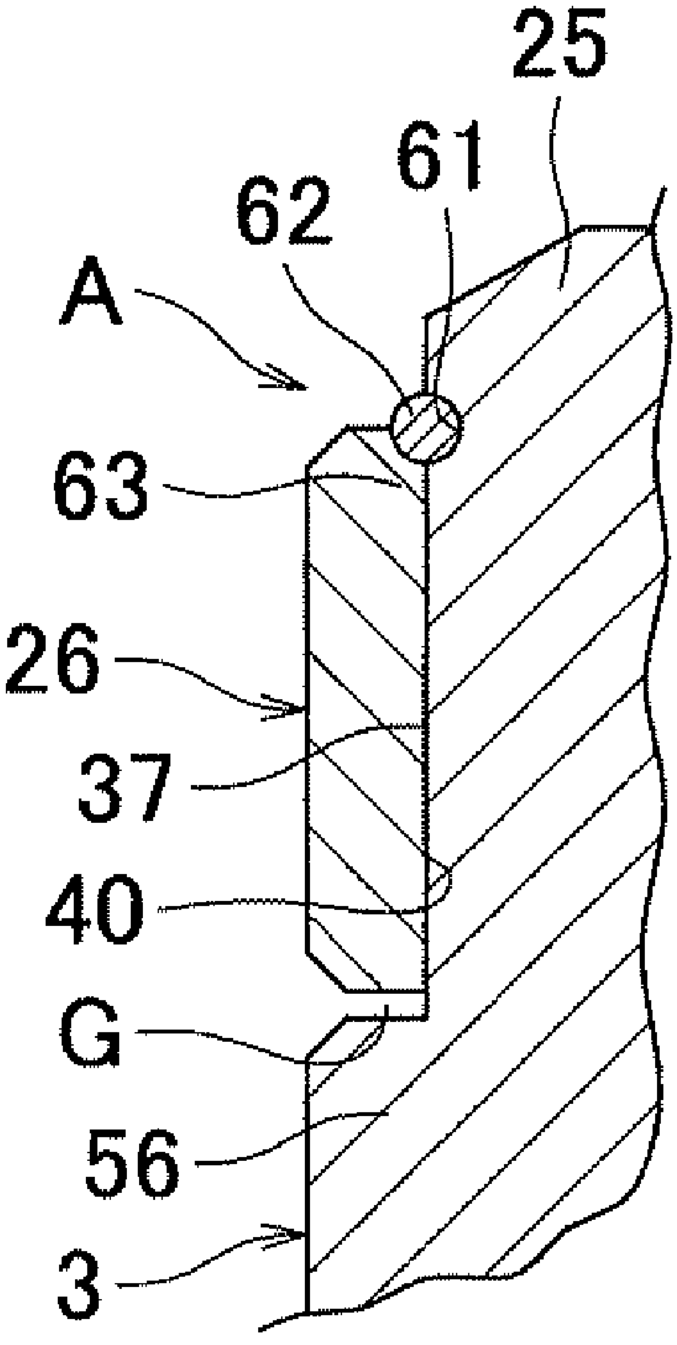
FIG. 3 is similar to a partial view of FIG. 1, illustrating an exemplary variation of the first embodiment of the present invention.

FIG. 3 illustrates an exemplary variation of the first embodiment of the present invention, similar to a partial view of FIG. 1. In the exemplary variation, the same members as (or similar members to) those of the first embodiment are described with the same reference numerals as a general rule. It is noted that the same applies to the below-mentioned second embodiment.

The exemplary variation in FIG. 3 differs from the first embodiment in the following points.

A substantially entire outer periphery of the support member 25 of the housing 3 is provided with the outer periphery fitting region 37 having a vertically straight outer peripheral surface. Corresponding thereto, a substantially entire inner periphery of the supported member 26 is provided with the inner periphery fitting region 40 having a vertically straight inner peripheral surface so as to fit to the outer periphery fitting region 37. The receive means A includes: a semicircular support groove 61 provided to the support member 25 of the housing 3; a retaining ring 62 fitted into the support groove 61; and a receiving member 63 provided to an upper portion of an inner periphery of the supported member 26. It is noted that, also in this exemplary variation, the lock means B illustrated in FIG. 2 is employed.

In the above exemplary variation, a part of the receive means A may be realized by the lock bolt 46 of the lock means B. In this case, a horizontal bolt insert hole is formed in an outer periphery portion of the support member 25 and the annular peripheral wall 27 of the supported member 26, and an arc groove-like bolt insert hole portion formed to the outer periphery portion of the support member 25 receives a middle length portion of the lock bolt 46.

Figure 4:
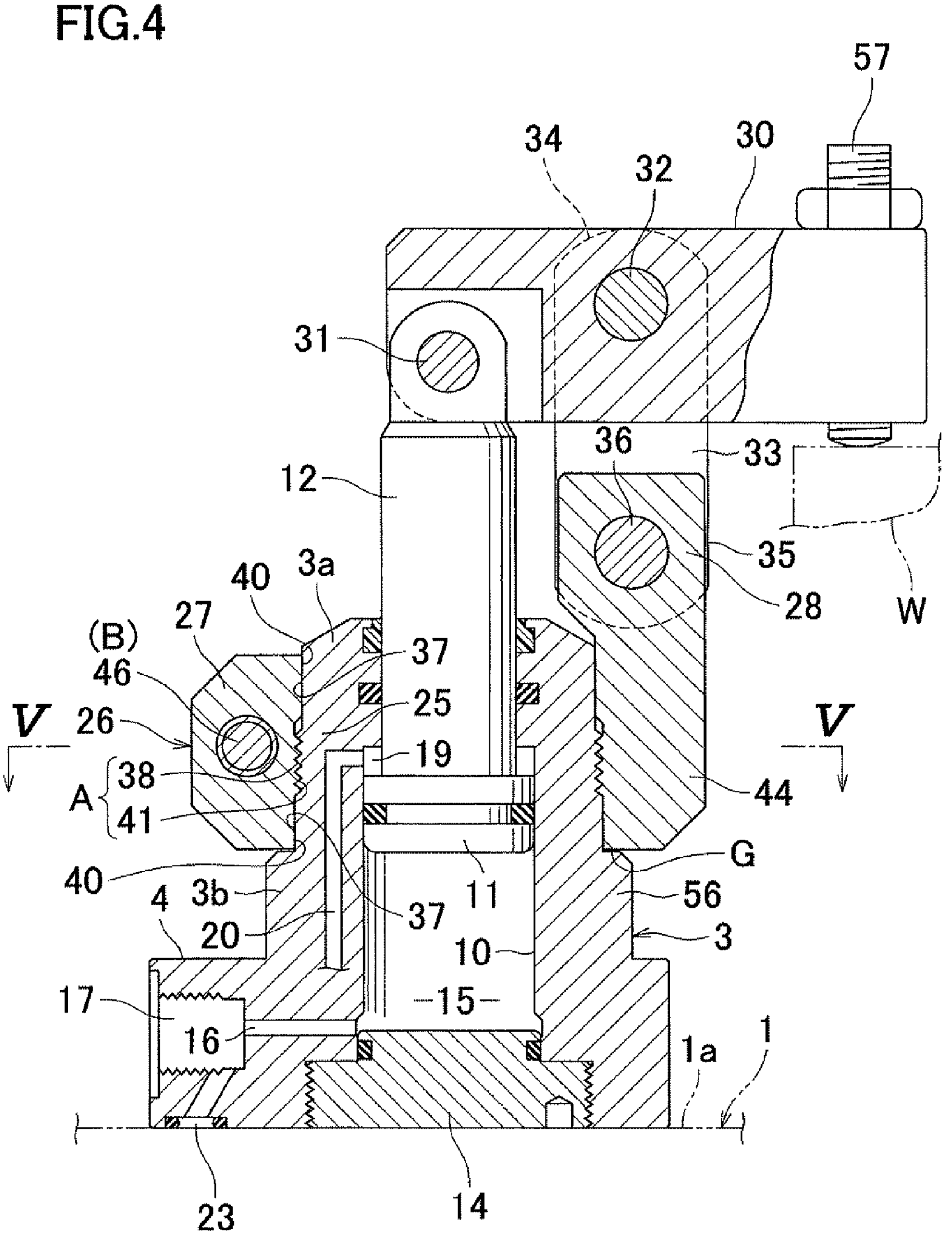
FIG. 4 is an elevation view of a link type clamping apparatus corresponding to a cross-sectional view taken along the IV-IV line in FIG. 5, illustrating a second embodiment of the present invention.
Figure 5:
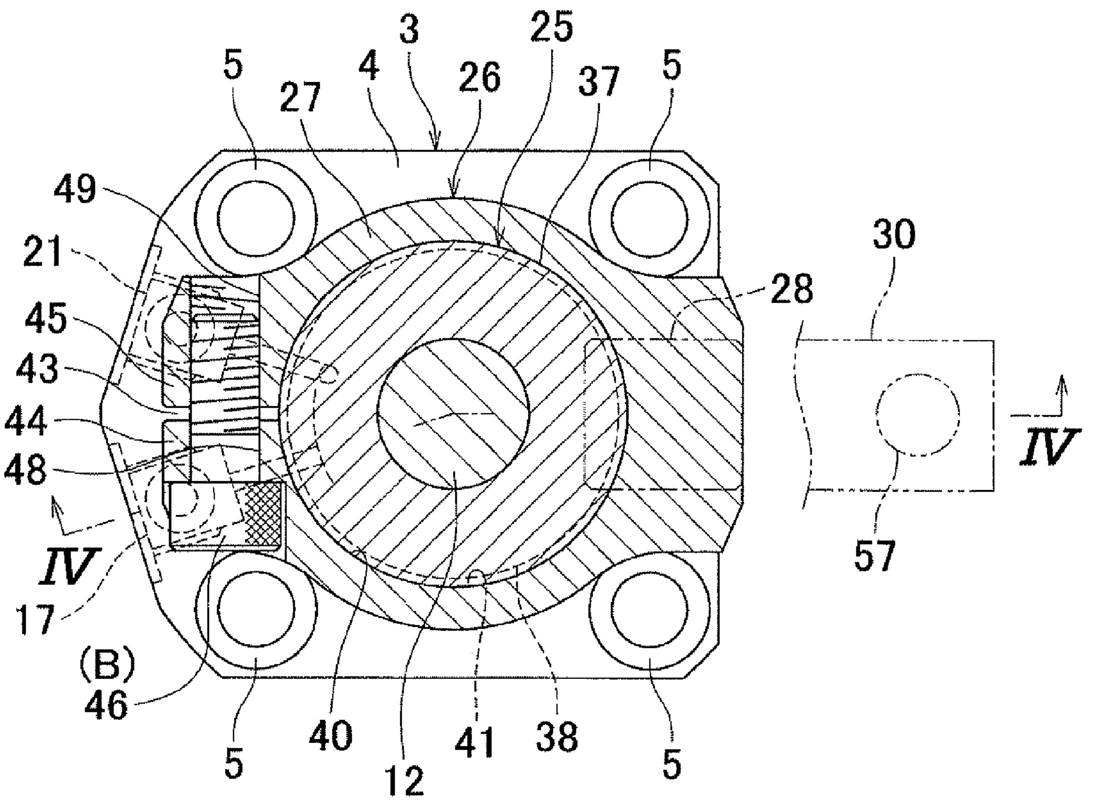
FIG. 5 is a cross-sectional view corresponding to a view taken along the V-V line in FIG. 4.

A second embodiment of the present invention is described with reference to FIG. 4 and FIG. 5. FIG. 4 and FIG. 5 are views similar to FIG. 1 and FIG. 2, respectively.

The second embodiment differs from the first embodiment in the following points.

The lock means B is provided opposite to the pivot portion 28. Specifically, the slit 43 which is a part of the lock means B is provided to the annular peripheral wall 27 so as to oppose the pivot portion 28 across the rod 12. Further, outer periphery fitting regions 37, 37 are respectively provided to both above and below the male screw region 38, and inner periphery fitting regions 40, 40 are respectively provided to both above and below the female screw region 41.

In the same manner as the first embodiment, a leg portion of the lock bolt 46 inserted into the bolt insert hole 48 of one peripheral wall portion 44 is screwed into the female screw hole 49 of the other peripheral wall portion 45, and the lock bolt 46 is tightened, thereby the annular peripheral wall 27 of the supported member 26 is diametrically contracted radially inward, so that the inner peripheral fitting region 40 of the annual peripheral wall 27 is pressed against the outer periphery fitting region 37. Thereby, the supported member 26 is fixed to the support member 25 at a desired rotation angle position around the axis.

The second embodiment brings about the following advantage.

A force acting from the link member 33 on the supported member 26 via the pivot portion 28 during a clamping operation is received by the housing 3 via the pair of inner periphery fitting regions 40, 40 respectively provided to both above and below the female screw region 41, thereby the supported member 26 is able to be reliably supported by the housing 3.

Further, the lock bolt 46 traversing the slit 43 is arranged opposite to the pivot portion 28. Thereby, a force acting from the link member 33 on the pivot portion 28 during a clamping operation is prevented from being directly applied to the lock bolt 46, thereby realizing the smaller-diameter and compact lock bolt 46.

Moreover, unlike the lopsided arrangement of the slit 43 of the first embodiment (see FIG. 2), the slit 43 of the second embodiment is arranged in balance at a center portion in a width direction of the supported member 26. Thus, the supported member 26 has a great strength.

It is noted that the second embodiment does not employ the phase determination means 51 of the first embodiment (see FIG. 2). However, the second embodiment may employ the same construction as the phase determination means. Further, instead of the combination of the set screw 52 and the engaging groove 54 illustrated in FIG. 2, the phase determination means may be a combination of an engaging member such as a ball urged by a spring, and an engaging groove.

Each of the above embodiments and the exemplary variation can be modified as follows.

A plurality of each of the outer periphery fitting region 37 and the male screw region 38 may be provided to the outer periphery of the support member 25, and one of whichever of the two regions may be provided while a plurality of the other regions are provided. Further, both of the regions may be vertically arranged in any order.

The inner periphery fitting region 40 and the female screw region 41 provided to the inner periphery of the supported member 26 are also modifiable in the same manner as the above.

Further, Such a construction that the outer periphery fitting region 37 is omitted and only the male screw region 38 is provided to the outer periphery of the support member 25, and the inner periphery fitting region 40 is omitted and only the female screw region 41 is provided to the inner periphery of the supported member 26 is also able to be employed.

Instead of the slit 43 and the lock bolt 46, the lock means B may be a lock nut which is screwed onto the male screw region 38 of the support member 25 in series with the supported member 26 and locks the supported member 26, or the lock means B may be a set screw having a larger diameter constructed in the same manner as the set screw 52.

Further, a shim or the like which adjusts a rotation phase may be placed on the upper surface of the annular shoulder portion 56 of the housing 3, and a lower surface of the supported member 26 is pressed against the shim by a screw thrust force of the supported member 26 acting on the support member 25, thereby positioning the supported member 26 at a desired rotation phase. In this case, the male screw region 38 and the female screw region 41 constructing the receive means A compose a part of the lock means.

Instead of being arranged as illustrated in FIG. 2 or FIG. 5, the slit 43 and the lock bolt 46 may be provided at any circumferential position of the annular peripheral wall 27.

A height position of the lock bolt 46 and a height position of the set screw 52 may be arranged so that the lock bolt 46 and the set screw 52 are at different height. The set screw 52 may be provided to any circumferential position of the annular peripheral wall 27.

One or two, or four or more engaging grooves 54 of the phase determination means 51 may be provided instead of three as illustrated.

Instead of the illustrated hydraulic double-acting, a means for driving the piston 11 and the rod 12 may be one which clamps by hydraulic pressure and restores by a spring, or one which clamps by a spring and restores by hydraulic is pressure. Instead of a liquid such as pressurized oil, a pressurized fluid utilized for the drive means may be a gas such as compressed air.

The clamping apparatus 2 may be arranged by turning the illustration upside down, or may be arranged oblique.

What is claimed is:

1. A link type clamping apparatus comprising:

a rod vertically movably inserted into a housing;

a clamp arm having one end portion in a longitudinal direction, the one end portion being vertically swingably connected to an upper portion of the rod;

a support member provided at an outer periphery of an upper portion of the housing;

an annular supported member attached to the support member so as to rotate around an axis;

a link member having a link lower portion and a link upper portion, the link lower portion being swingably connected to a pivot portion provided to the supported member, and the link upper portion being swingably connected to a non-edge portion in a longitudinal direction of the clamp arm;

a receive means which receives an upward force acting from the link member on the pivot portion during a clamping operation, and is provided to the support member and the supported member; and a lock means for fixing the supported member to the support member at a desired rotation angle position around the axis, wherein the receive means includes: at least one male screw region formed on an outer periphery of the support member of the housing; and at least one female screw region formed on an inner periphery of the supported member so as to vertically movably screw onto the male screw region, wherein the outer periphery of the support member of the housing is provided with at least one outer periphery fitting region having a vertically straight outer peripheral surface and the male screw region, in a vertical direction, and wherein the inner periphery of the supported member is provided with at least one inner periphery fitting region having a vertically straight inner peripheral surface which fits to the outer periphery fitting region and the female screw region, in a vertical direction.

2. The link type clamping apparatus according to claim 1, wherein the outer periphery fitting regions are respectively provided to both above and below the male screw region, and the inner periphery fitting regions are respectively provided to both above and below the female screw region.

3. The link type clamping apparatus according to claim 1, wherein the lock means includes: a slit formed in an annular peripheral wall of the supported member; and a tightening member which makes peripheral wall portions approach each other, the peripheral wall portions being respectively positioned at both sides of the slit.

4. A link type clamping apparatus comprising:

a rod vertically movably inserted into a housing;

a clamp arm having one end portion in a longitudinal direction, the one end portion being vertically swingably connected to an upper portion of the rod;

a support member provided at an outer periphery of an upper portion of the housing;

an annular supported member attached to the support member so as to rotate around an axis;

a link member having a link lower portion and a link upper portion, the link lower portion being swingably connected to a pivot portion provided to the supported member, and the link upper portion being swingably connected to a non-edge portion in a longitudinal direction of the clamp arm;

a receive means which receives an upward force acting from the link member on the pivot portion during a clamping operation, and is provided to the support member and the supported member; and a lock means for fixing the supported member to the support member at a desired rotation angle position around the axis, wherein the lock means includes: a slit formed in an annular peripheral wall of the supported member; and a tightening member which makes peripheral wall portions approach each other, the peripheral wall portions being respectively positioned at both sides of the slit.

5. A link type clamping apparatus comprising:

a rod vertically movably inserted into a housing;

a clamp arm having one end portion in a longitudinal direction, the one end portion being vertically swingably connected to an upper portion of the rod;

a support member provided at an outer periphery of an upper portion of the housing;

an annular supported member attached to the support member so as to rotate around an axis;

a link member having a link lower portion and a link upper portion, the link lower portion being swingably connected to a pivot portion provided to the supported member, and the link upper portion being swingably connected to a non-edge portion in a longitudinal direction of the clamp arm;

a receive means which receives an upward force acting from the link member on the pivot portion during a clamping operation, and is provided to the support member and the supported member; and a lock means for fixing the supported member to the support member at a desired rotation angle position around the axis, wherein the receive means includes: at least one male screw region formed on an outer periphery of the support member of the housing; and at least one female screw region formed on an inner periphery of the supported member so as to vertically movably screw onto the male screw region, wherein the lock means includes: a slit formed in an annular peripheral wall of the supported member; and a tightening member which makes peripheral wall portions approach each other, the peripheral wall portions being respectively positioned at both sides of the slit.

6. The link type clamping apparatus according to any of claims 4 to 3, wherein the slit is provided in the annular peripheral wall and arranged so as to oppose the pivot portion across the rod.

* * * * *